L. SCHLESINGER.
VEGETABLE DISH.
APPLICATION FILED SEPT. 8, 1909.

943,162.  Patented Dec. 14, 1909.

Witnesses:

Inventor
Leo Schlesinger
By his Attorney
Joseph L. Levy

UNITED STATES PATENT OFFICE.

LEO SCHLESINGER, OF NEW YORK, N. Y.

VEGETABLE-DISH.

943,162.

Specification of Letters Patent. Patented Dec. 14, 1909.

Application filed September 8, 1909. Serial No. 516,659.

*To all whom it may concern:*

Be it known that I, LEO SCHLESINGER, a citizen of the United States, residing in the city of New York, county and State of New York, have invented a new and useful Improvement in Vegetable-Dishes and the Like, of which the following is a specification.

My invention has relation to improvements in vegetable dishes and articles of that kind and it consists in a dish of usual and conventional construction, divided off into compartments formed by partitions extending from the center of the dish to its sides, and a recess formed in the upper part and approximate center of the partition to receive a supplemental dish.

My invention also resides in the details of construction, and the combination of parts hereinafter set forth and further pointed out in the claims.

Figure 1:
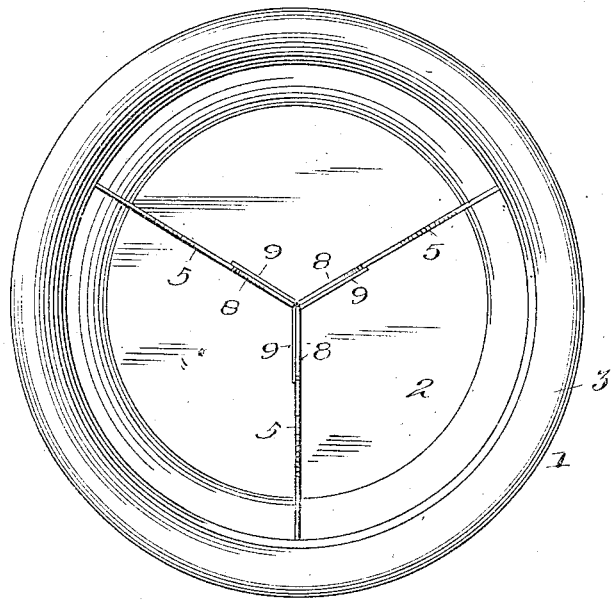
Figure 2:
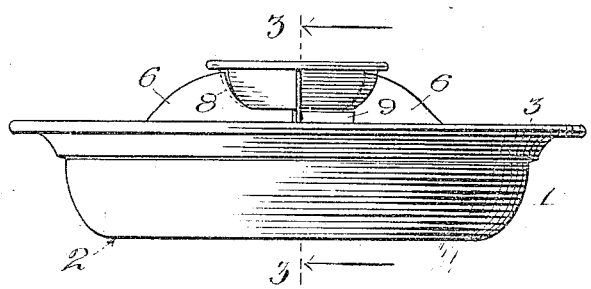
Figure 3:
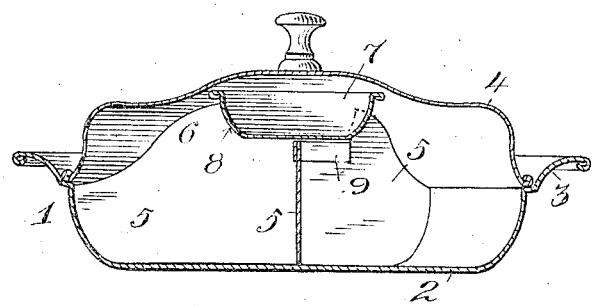

In the drawing forming part of this specification Figure 1 is a plan view of my improved dish with the cover removed. Fig. 2 is a side view thereof. Fig. 3 is a sectional elevation on the lines 3—3 Fig. 2 looking in the direction of the arrows.

Similar numerals of reference indicate corresponding parts throughout the several views.

In the drawing 1 represents a dish or pan of ordinary or conventional construction, with a bowl portion 2 and an outwardly extending flange 3 for the reception of a cover 4. The bowl of the dish is divided off into separate spaces by the upright partitions 5 which extend from the proximate center of the dish to the sides thereof, which partitions are preferably elevated at the center as at 6 and extend above the level of the outward extending flange of the dish.

I prefer to give the central parts of the partitions considerable height compared with the depth of the dish so as to increase the containing capacity of the spaces formed by the partitions, and also to provide means for the support of a smaller or additional dish 7 which may be used to hold sauce or which may be put to other obvious uses.

I provide a support for the dish 7 on the upper and inner ends of the partitions, by forming a recess 8 therein of a shape substantially corresponding to the shape of the dish so that it will fit snugly therein as shown in Figs. 2 and 3.

In order to more firmly support the dish and to brace the upper ends of the partitions together small strips 9 are secured to the inner ends of the partitions immediately below the recess.

The particular shape of the partitions is not essential, except for the reasons above stated I prefer that they have the central elevations; and likewise the number of partitions is not essential as they may be increased indefinitely without departing from the spirit of my invention.

Having described my invention, I claim:—

1. The combination in an article of the class described of the upright partitions, a supplemental dish smaller than the before mentioned dish, and means formed in said partitions for supporting said supplemental dish.

2. The combination in an article of the class described, of the dish, the upright partitions therein meeting at the proximate center of the dish, a recess formed in said partitions at the point of juncture, and a supplemental dish supported in said recess.

3. In an article of the class described, the combination of the dish, the partitions radiating from the center of the dish to the sides of the dish and of a height at said center greater than the depth of the dish, a recess formed in the meeting ends of said partitions, and a supplemental dish received in said recess.

Signed at the city, county and State of New York, this 3rd day of Sept. 1909.

LEO SCHLESINGER.

Witnesses:
ELIAS MILLER,
GEORGE MILLER.